(12) United States Patent
Miyamae et al.

(10) Patent No.: US 10,978,924 B2
(45) Date of Patent: Apr. 13, 2021

(54) ROTOR OF ELECTRICAL ROTATING MACHINE

(71) Applicant: KAWASAKI JUKOGYO KABUSHIKI KAISHA, Kobe (JP)

(72) Inventors: Ryo Miyamae, Kobe (JP); Shoichi Takahashi, Kobe (JP); Tatsuya Ohno, Nishinomiya (JP); Yoshihiko Ozaki, Kobe (JP); Koji Hashimoto, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 273 days.

(21) Appl. No.: 15/772,103

(22) PCT Filed: Oct. 20, 2016

(86) PCT No.: PCT/JP2016/004639
§ 371 (c)(1),
(2) Date: Apr. 30, 2018

(87) PCT Pub. No.: WO2017/073036
PCT Pub. Date: May 4, 2017

(65) Prior Publication Data
US 2018/0316233 A1    Nov. 1, 2018

(30) Foreign Application Priority Data
Oct. 28, 2015  (JP) .............................. JP2015-211743

(51) Int. Cl.
*H02K 1/28*     (2006.01)
*H02K 1/30*     (2006.01)
*H02K 1/27*     (2006.01)

(52) U.S. Cl.
CPC ............... *H02K 1/28* (2013.01); *H02K 1/274* (2013.01); *H02K 1/278* (2013.01); *H02K 1/2753* (2013.01); *H02K 1/30* (2013.01)

(58) Field of Classification Search
CPC .. H02K 1/28; H02K 1/30; H02K 1/27; H02K 1/274; H02K 1/2753; H02K 1/2733;
(Continued)

(56) References Cited

U.S. PATENT DOCUMENTS

2013/0221789 A1*  8/2013  Atkinson ............. H02K 1/2773
310/156.67

FOREIGN PATENT DOCUMENTS

| JP | 2000278898 A | * 10/2000 |
| JP | 2004-266919 A | 9/2004 |
| JP | 2008-295178 A | 12/2008 |

OTHER PUBLICATIONS

Fuse et al, Permanent Magnet Rotary Electric Machine, Toshiba Corp, JP 2000278898 (English Machine Translation) (Year: 2000).*

* cited by examiner

*Primary Examiner* — Quyen P Leung
*Assistant Examiner* — Alexander A Singh
(74) *Attorney, Agent, or Firm* — Oliff PLC

(57) ABSTRACT

A rotor of an electrical rotating machine includes: a rotor shaft; a cylindrical sleeve externally fitted to the rotor shaft and extending in an axial direction X; and a plurality of permanent magnets serving as field magnets, the plurality of permanent magnets being provided between the rotor shaft and the sleeve in a radial direction and retained by the sleeve around the rotor shaft. The sleeve is formed by a plurality of short sleeves arranged in the axial direction X, and end portions of the short sleeves that are adjacent to each other, the end portions being butted together in the axial direction (Continued)

X, are mechanically joined together in a torque-transmittable manner.

8 Claims, 2 Drawing Sheets

(58) Field of Classification Search
CPC .... H02K 1/278; H02K 1/2726; H02K 1/2706; H02K 1/2713; H02K 1/272
USPC ............ 310/156.28, 156.08, 156.12, 156.23, 310/156.26, 156.29, 156.31
See application file for complete search history.

ROTOR OF ELECTRICAL ROTATING MACHINE

TECHNICAL FIELD

The present invention relates to the structure of the rotor of a permanent-magnet synchronous electrical rotating machine.

BACKGROUND ART

Conventionally, there are known permanent-magnet synchronous electrical rotating machines in which permanent magnets are used as field magnets, such as a permanent-magnet synchronous motor and a permanent-magnet synchronous generator. The permanent-magnet synchronous electrical rotating machines are roughly categorized into the following types in terms of the manner of retaining the permanent magnets on the rotor: a surface permanent magnet (SPM) type, in which the magnets are mounted on the rotor surface; and an interior permanent magnet (IPM) type, in which the magnets are incorporated in the rotor core. Patent Literature 1 discloses an electrical rotating machine of the surface permanent magnet type.

The permanent-magnet electrical rotating machine disclosed in Patent Literature 1 includes: a stator formed by winding armature windings around an armature core; and a rotor rotatably inserted in the axial central portion of the stator. The rotor includes: a shaft; a plurality of retaining rings arranged in the axial direction of the shaft and covering the peripheral surface of the shaft; and a plurality of permanent magnets serving as field magnets, the plurality of permanent magnets being fixed to the inner peripheral surfaces of the plurality of retaining rings. The plurality of retaining rings, which are arranged in the axial direction, are joined together by welding. In the electrical rotating machine, the plurality of retaining rings retain the permanent magnets around the rotor so that, while the rotor is rotating, the permanent magnets will not fly away due to centrifugal force exerted on the permanent magnets.

CITATION LIST

Patent Literature

PTL 1: Japanese Laid-Open Patent Application Publication No. 2004-266919

SUMMARY OF INVENTION

Technical Problem

An object of the present invention is to provide a permanent magnet retaining structure of the rotor of a permanent-magnet synchronous electrical rotating machine of the aforementioned surface permanent magnet type, the structure allowing the electrical rotating machine to deliver predetermined performance even when the rotor of the electrical rotating machine rotates at high speed.

Solution to Problem

In recent years, the performance of permanent magnets has improved and the price of such high-performance permanent magnets has dropped, and for these reasons, the application of permanent magnets in large electrical rotating machines has become more common. In such large electrical rotating machines, the size of the permanent magnets is large. In addition, energy loss due to eddy currents from the permanent magnets increases in accordance with increase in the rotational speed of the rotor. In the electrical rotating machine of Patent Literature 1, the plurality of retaining rings retaining the permanent magnets are conductive rings. For this reason, eddy currents also flow though these retaining rings, and thereby eddy-current loss occurs. In Patent Literature 1, since the plurality of retaining rings are integrated together by welding, the electrical resistance thereof is low, and the energy loss due to the eddy currents generated in the retaining rings cannot be suppressed.

In view of the above, a rotor of an electrical rotating machine according to a first aspect of the present invention includes: a rotor shaft; a cylindrical sleeve externally fitted to the rotor shaft and extending in an axial direction; and a plurality of permanent magnets serving as field magnets, the plurality of permanent magnets being provided between the rotor shaft and the sleeve in a radial direction and retained by the sleeve around the rotor shaft. The sleeve is formed by a plurality of short sleeves arranged in the axial direction, and end portions of the short sleeves that are adjacent to each other, the end portions being butted together in the axial direction, are mechanically joined together in a torque-transmittable manner.

In the above rotor, since the sleeve is divided up in the axial direction and the short sleeves are mechanically joined together, the electrical resistance of the sleeve is higher and the path of the eddy currents is shorter than in a case where the sleeve is a single integrated component or a case where the short sleeves are joined together by welding. As a result, the eddy currents flowing through the sleeve are reduced, and thereby eddy-current loss can be reduced. This makes it possible to allow the electrical rotating machine to deliver predetermined performance even when the rotor rotates at high speed.

Since the short sleeves are joined together in a torque-transmittable manner, rotational torque can be transmitted by utilizing the sleeve.

Moreover, since the sleeve is divided up in the axial direction, the machining can be performed more easily than in a case where the sleeve is a single integrated component. As a result, precision in terms of the shape of the sleeve can be increased. This makes it possible to readily realize a large-sized rotor for use in an electrical rotating machine with increased power density.

In the above rotor of an electrical rotating machine, the end portions of the adjacent short sleeves, the end portions being butted together in the axial direction, may be joined together by face gear coupling.

According the above, circumferential coupling, circumferential positioning, and self-aligning of the short sleeves are realized by merely meshing the face gears of the short sleeves with each other. This makes it possible to simplify the work of producing the rotor.

The above rotor of an electrical rotating machine may further include a pair of end members that is fixed to the rotor shaft and between which the sleeve is sandwiched from both sides in the axial direction, such that the adjacent short sleeves are in pressure contact with each other.

By sandwiching the plurality of short sleeves between the pair of end members in the above manner, the plurality of short sleeves can be integrated together.

In the above rotor of an electrical rotating machine, one of the plurality of short sleeves and one of the pair of end members fixed to the rotor shaft are mechanically joined together in a torque-transmittable manner.

Accordingly, when the permanent magnets are separated from the rotor shaft during the rotation of the rotor, the permanent magnets are pressed against the sleeve, and the torque of the permanent magnets is transmitted to the rotor shaft via the sleeve.

In the above rotor of an electrical rotating machine, each of the plurality of short sleeves may be made of a non-magnetic material.

This makes it possible to suppress the influence of the sleeve on the electromagnetic design of the rotor.

In an electrical rotating machine of the surface permanent magnet type, the centrifugal force exerted on the magnets increases in accordance with increase in the rotational speed of the rotor, and the centrifugal force causes the magnets to be separated from the outer peripheral surface of the rotor shaft. At the time, if the magnets are not sufficiently pressed against the sleeve, the torque of the magnets cannot be efficiently transmitted to the rotor shaft. Consequently, for example, predetermined performance cannot be delivered, or the rotor loses its balance and vibration occurs.

In view of the above, a rotor of an electrical rotating machine according to a second aspect of the present invention includes: a rotor shaft; a cylindrical sleeve externally fitted to the rotor shaft and extending in an axial direction; a plurality of permanent magnets serving as field magnets, the plurality of permanent magnets being provided between the rotor shaft and the sleeve in a radial direction and retained by the sleeve around the rotor shaft, the plurality of permanent magnets forming annular rows, each annular row being formed by part of the plurality of permanent magnets, the part of the plurality of permanent magnets being arranged on a same circumference on an outer peripheral surface of the rotor shaft; and a stopper that is, in each annular row, disposed between the permanent magnets that are adjacent to each other in a circumferential direction of the annular row, the stopper being disposed on the same circumference with the adjacent permanent magnets and fixed to the rotor shaft in a torque-transmittable manner.

In the above rotor of an electrical rotating machine according to the first aspect, the plurality of permanent magnets may form annular rows, each annular row being formed by part of the plurality of permanent magnets, the part of the plurality of permanent magnets being arranged on a same circumference on an outer peripheral surface of the rotor shaft. The rotor may further include a stopper that is, in each annular row, disposed between the permanent magnets that are adjacent to each other in a circumferential direction of the annular row, the stopper being disposed on the same circumference with the adjacent permanent magnets and fixed to the rotor shaft in a torque-transmittable manner.

The stopper included in the rotor as described above blocks the permanent magnets that are separated from the rotor shaft during the rotation of the rotor from moving in the circumferential direction, and thereby the positions of the permanent magnets relative to the rotor shaft in the circumferential direction are kept. Since the permanent magnets separated from the rotor shaft during the rotation of the rotor are pressed against the stopper, the torque of the permanent magnets is transmitted to the rotor shaft via the stopper. Thus, even when the permanent magnets are separated from the rotor shaft, the torque of the permanent magnets can be transmitted to the rotor shaft. This makes it possible to allow the electrical rotating machine to deliver predetermined performance even when the rotor rotates at high speed. Also, vibration that is caused when the rotor loses its balance can be suppressed.

In the above rotors of electrical rotating machines according to the first and second aspects, the stopper may be made of a non-magnetic material.

This makes it possible to suppress the influence of the stopper on the electromagnetic design of the rotor.

In the above rotors of electrical rotating machines according to the first and second aspects, the stopper may be a key that includes: a base portion fitted in a key groove formed in the rotor shaft; and a head portion protruding from the outer peripheral surface of the rotor shaft in a radial direction.

According to the above, the stopper joined to the rotor shaft in a torque-transmittable manner can be realized with a simple structure that is easy to manufacture.

Advantageous Effects of Invention

The present invention makes it possible to provide a permanent magnet retaining structure of the rotor of a permanent-magnet synchronous electrical rotating machine of the surface permanent magnet type, the structure allowing the electrical rotating machine to deliver predetermined performance even when the rotor rotates at high speed.

DESCRIPTION OF EMBODIMENTS

Figure 1:
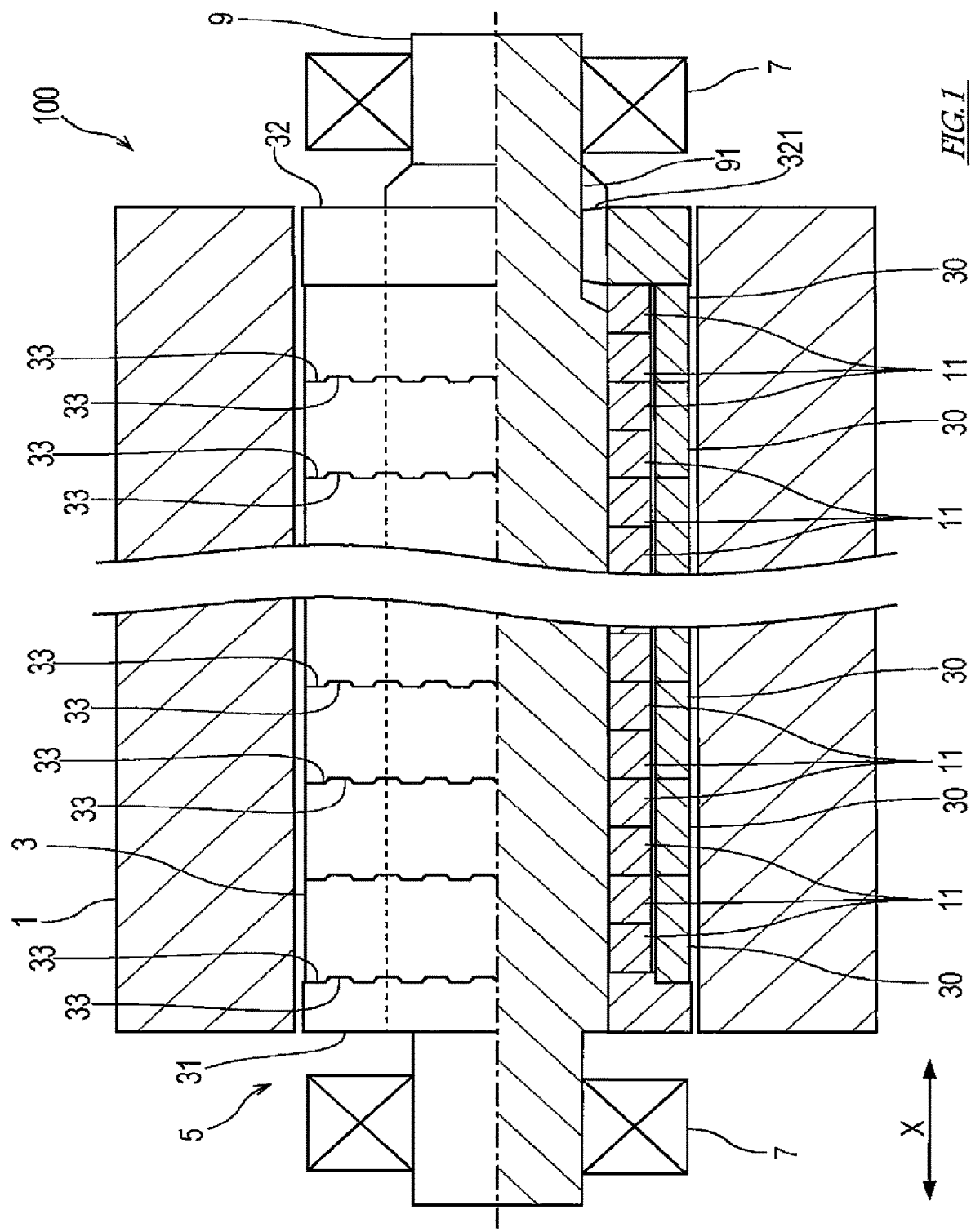
FIG. 1 is a sectional view showing a schematic configuration of a permanent-magnet electrical rotating machine according to one embodiment of the present invention.

Next, one embodiment of the present invention is described with reference to the drawings. First, with reference to FIG. 1, a schematic configuration of an electrical rotating machine 100 according to the embodiment of the present invention is described. FIG. 1 is a sectional view showing a schematic configuration of a permanent-magnet electrical rotating machine according to the embodiment of the present invention. In FIG. 1, only the lower half of a rotor 5 is shown in section.

The electrical rotating machine 100 includes a stator 1 and the rotor 5. The stator 1 is formed by winding armature windings around an armature core (the armature windings and the armature core are not shown). The rotor 5 includes: a rotor shaft 9; a sleeve 3, which surrounds the peripheral surface of the rotor shaft 9; and a plurality of permanent magnets 11 serving as field magnets, the plurality of permanent magnets 11 being disposed between the outer peripheral surface of the rotor shaft 9 and the inner peripheral surface of the sleeve 3. The rotor 5 is inserted in the axial central portion of the stator 1, and the rotor shaft 9 is supported by bearings 7 such that the rotor 5 is rotatable relative to the stator 1. In the electrical rotating machine 100 thus configured, rotational torque is generated by a rotating magnetic field generated on the stator 1 and magnetic fields generated on the rotor 5, and thereby the rotor 5 rotates.

Figure 2:
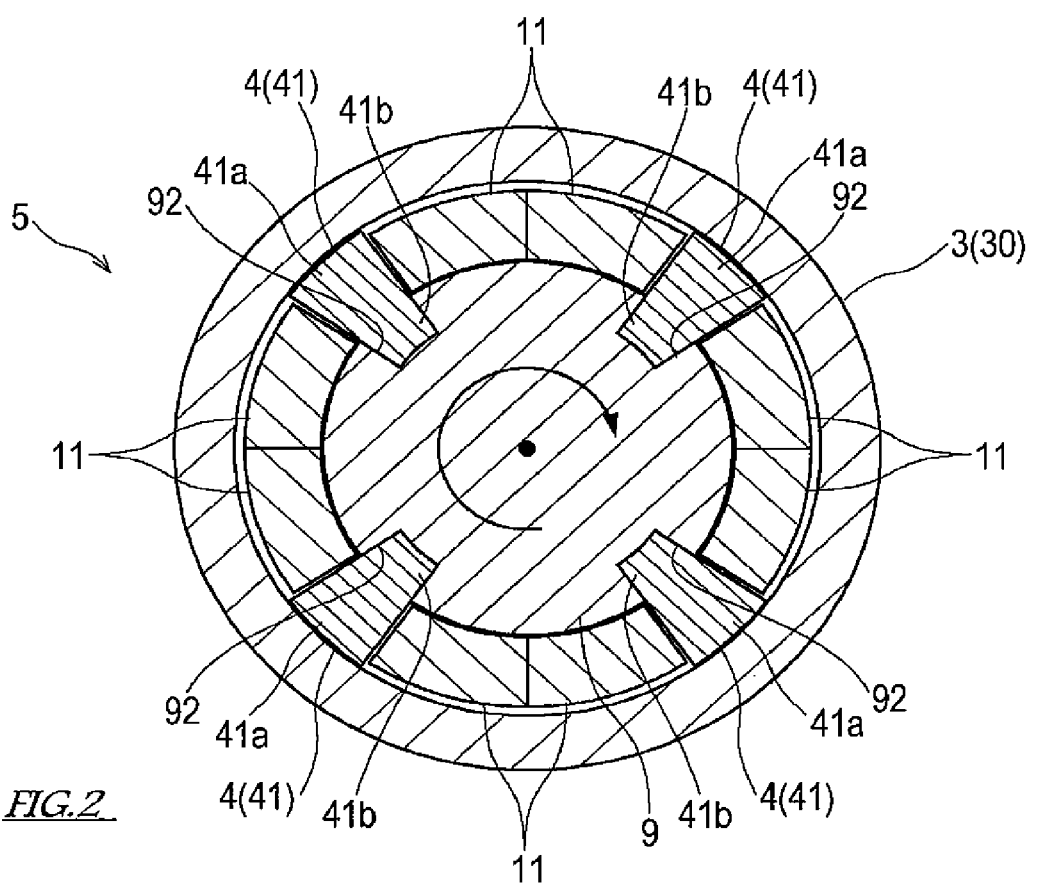
FIG. 2 is a schematic sectional view of a rotor, the sectional view being taken orthogonally to the axial direction of the rotor.

Next, the structure of the rotor 5 is described in detail. FIG. 2 is a schematic sectional view of the rotor 5, the sectional view being taken orthogonally to an axial direction X of the rotor 5.

As shown in FIG. 1 and FIG. 2, a plurality of permanent magnets 11 are arranged around the rotor shaft 9 in the circumferential direction to form annular rows. The annular rows formed by the plurality of permanent magnets 11 are arranged in the axial direction X of the rotor 5.

In each annular row of the permanent magnets 11, the magnets whose inner peripheral surface side (i.e., the rotor shaft 9 side) is magnetized to the south pole and whose outer peripheral surface side (i.e., the sleeve 3 side) is magnetized to the north pole, and the magnets whose outer peripheral surface side is magnetized to the south pole and whose inner peripheral surface side is magnetized to the north pole, are arranged alternately in accordance with the number of poles. In the present embodiment, one pair of permanent magnets 11 whose inner peripheral surface side is magnetized to the south pole, and one pair of permanent magnets 11 whose inner peripheral surface side is magnetized to the north pole, are arranged alternately in the circumferential direction, and thus each annular row is formed by a total of eight permanent magnets 11.

Stoppers 4 are provided such that each stopper 4 is disposed between one pair of permanent magnets 11 whose inner peripheral surface side is magnetized to the south pole and one pair of permanent magnets 11 whose inner peripheral surface side is magnetized to the north pole, and such that each stopper 4 is disposed between these pairs of permanent magnets 11 in the circumferential direction. In this manner, the stoppers 4 are arranged on the same circumference with these permanent magnets 11. The stoppers 4 according to the present embodiment are keys 41 driven into the rotor shaft 9. In the present embodiment, the stoppers 4 are provided at four positions for each annular row of the permanent magnets 11. However, it will suffice if the stopper 4 is provided at, at least, one position for each annular row of the permanent magnets 11.

Each key 41 is made of, for example, a non-magnetic material that is light-weight and that has sufficient strength for bearing the centrifugal force, such as a titanium alloy. A plurality of key grooves 92 each extending in the axial direction X are formed in the outer peripheral surface of the rotor shaft 9 at predetermined intervals in the circumferential direction. A base portion 41b of each key 41 is fitted in a corresponding one of the key grooves 92, and thereby the keys 41 are fixed to the rotor shaft 9. Torque is transmittable to the rotor shaft 9 from the keys 41 fixed in this manner. A head portion 41a of each key 41 protrudes in the outward radial direction from the corresponding key groove 92, and the head portions 41a of the keys 41 are positioned on the same circumference with the permanent magnets 11 forming the annular row. The head portion 41a of each key 41 substantially functions as the stopper 4.

When the permanent magnets 11 are seen in the axial direction X, each permanent magnet 11 is sector-shaped such that the outer peripheral arc is slightly larger than the inner peripheral arc. When the keys 41 are seen in the axial direction X, at least the head portion 41a of each key 41 is sector-shaped. In the present embodiment, when the keys 41 are seen in the axial direction X, the base portion 41b of each key 41 is also sector-shaped. However, the shape of the base portion 41b of each key 41 is not thus limited. As thus described, when the rotor 5 is seen in the axial direction X, each of the plurality of permanent magnets 11 and the head portions 41a of the keys 41 arranged around the rotor shaft 9 is sector-shaped. Therefore, gaps formed between the permanent magnets 11 that are adjacent to each other and between the permanent magnet 11 and the key 41 that are adjacent to each other can be reduced. This makes it possible to effectively block the movement of the permanent magnets 11 in the circumferential direction.

The sleeve 3 of the rotor 5 is formed by a plurality of short sleeves 30 arranged in the axial direction X. Each short sleeve 30 is made of, for example, a non-magnetic material that has sufficient strength for bearing the centrifugal force, such as a nickel alloy. The dimension of each short sleeve 30 in the axial direction X is greater than the dimension of each permanent magnet 11 in the axial direction X. In the present embodiment, the dimension of each short sleeve 30 in the axial direction X is about twice the dimension of each permanent magnet 11 in the axial direction X. However, the dimensional relationship between the short sleeves 30 and the permanent magnets 11 in the axial direction X is not limited to the present embodiment.

A pair of end members 31 and 32 is provided such that the end members 31 and 32 are provided at both ends, respectively, of the plurality of short sleeves 30 in the axial direction X, i.e., at both ends, respectively, of the sleeve 3 in the axial direction X. One end member 31 is fixed to the rotor shaft 9, and the other end member 32 is nut-shaped. A female screw 321 is formed on the inner periphery of the other end member 32. A male screw 91 formed on the rotor shaft 9 is screwed in the female screw 321.

Each short sleeve 30 has round openings at both ends thereof in the axial direction X. On the edge of each round opening, a face gear 33 is formed by a plurality of radially extending teeth regularly arranged in the circumferential direction. Between the short sleeves 30 that are adjacent to each other in the axial direction X, the teeth of the face gears 33 formed on the surfaces opposite to each other in the axial direction X mesh with each other, thereby forming a face gear coupling. By the face gear coupling, circumferential coupling, circumferential positioning, and self-aligning of the short sleeves 30 that are adjacent to each other are realized.

The plurality of short sleeves 30 arranged in the axial direction X receive pressure from both sides in the axial direction X, the pressure being applied by the pair of end members 31 and 32, such that the adjacent short sleeves 30 are in pressure contact with each other in the axial direction X. In this manner, the short sleeves 30 that are adjacent to each other in the axial direction X are fixed together, such that they are immovable relative to each other in the circumferential direction and the axial direction X, and thereby mechanically butt-joined together. The adjacent short sleeves 30 mechanically jointed together in this manner are capable of transmitting torque. The plurality of short sleeves 30, which are thus connected sequentially in the axial direction X, form the cylindrical (hollow shaft-like) sleeve 3.

Next, a method of manufacturing the rotor 5 configured as above is described.

First, the end member 31 is fitted to the rotor shaft 9 in the axial direction X, and the end member 31 is fixed to the rotor shaft 9 by welding or the like. The end member 31 is flange-shaped and protrudes in the radial direction from the rotor shaft 9. The face gear 33 is formed on one side of the end member 31 in the axial direction X, on which side the permanent magnets 11 are disposed. It should be noted that the end member 31 may be integrally formed on the rotor shaft 9 by machining the rotor shaft 9.

Next, the plurality of permanent magnets 11 are arranged around the rotor shaft 9, and each of the permanent magnets 11 is adhered to the outer peripheral surface of the rotor shaft 9 by an adhesive or the like. Subsequently, the keys 41 are each driven into a corresponding one of the key grooves 92 of the rotor shaft 9. Here, the outer peripheral surfaces of the keys 41 may be made substantially flush with the outer peripheral surfaces of the permanent magnets 11, or the outer peripheral surfaces of the keys 41 may be positioned slightly outward of the outer peripheral surfaces of the permanent magnets 11 in the radial direction.

Thereafter, the plurality of short sleeves 30 are sequentially fitted to the rotor shaft 9 in the axial direction X. Here, the short sleeve 30 that is fitted first and the end member 31 are butted together in the axial direction X, such that the teeth of the face gears 33 formed on the butted surfaces are meshed with each other. Also, the short sleeves 30 that are arranged in the axial direction X are butted together in the axial direction X, such that the teeth of the face gears 33 formed on the butted surfaces are meshed with each other. Before or after the short sleeves 30 are fitted to the rotor shaft 9, gaps between the short sleeves 30 and the permanent magnets 11 or the keys 41, the gaps being formed in the radial direction, are filled with a filler that is, for example, a cured resin material.

Lastly, the end member 32 is fitted to the rotor shaft 9 in the axial direction X. Here, the female screw 321 of the end member 32 is screwed with the male screw 91 of the rotor shaft 9, such that the sleeve 3 is sandwiched between the end member 31 and the end member 32 to receive pressure from both sides in the axial direction X, and thereby the adjacent short sleeves 30 are in pressure contact with each other in the axial direction X. It should be noted that the face gear 33 is not formed on a surface of the short sleeve 30 that is fitted to the rotor shaft 9 at last, the surface coming into contact with the end member 32. The rotor 5 can be manufactured through these steps.

As described above, the rotor 5 of the electrical rotating machine 100 of the present embodiment includes: the rotor shaft 9; the cylindrical sleeve 3 externally fitted to the rotor shaft 9 and extending in the axial direction X; and the plurality of permanent magnets 11 serving as field magnets, the plurality of permanent magnets 11 being provided between the rotor shaft 9 and the sleeve 3 in the radial direction and retained by the sleeve 3 around the rotor shaft 9. The sleeve 3 is formed by the plurality of short sleeves 30 arranged in the axial direction X, and end portions of the short sleeves 30 that are adjacent to each other, the end portions being butted together in the axial direction X, are mechanically joined together in a torque-transmittable manner.

When the rotor 5 of the electrical rotating machine 100 rotates, eddy currents are generated in the permanent magnets 11, and similarly, eddy currents are generated in the sleeve 3. Here, since the sleeve 3 is divided up in the axial direction X, the electrical resistance of the sleeve 3 is higher and the path of the eddy currents (i.e., the length of the flow of the eddy currents) is shorter than in a case where the sleeve 3 is a single integrated component or a case where the short sleeves 30 are joined together by welding. As a result, the eddy currents flowing through the sleeve 3 are reduced overall, and owing to the reduction of eddy-current loss, energy loss in the electrical rotating machine 100 can be suppressed. In addition, generation of heat due to the eddy currents can be suppressed, which makes it possible to reduce the risk of permanent demagnetization of the permanent magnets 11 due to increase in the temperature of the sleeve 3.

In the above-described rotor 5, since the short sleeves 30 are joined together in a torque-transmittable manner, rotational torque can be transmitted by utilizing the sleeve 3.

In the above-described rotor 5, the sleeve 3 is divided up in the axial direction X. Accordingly, in this case, if the length of the rotor 5 in the axial direction X is greater than the radius of the rotor 5, the machining can be performed more easily than in a case where the sleeve 3 is a single integrated component. As a result, precision in terms of the shape of the sleeve 3 can be increased. Moreover, since the short sleeves 30 are joined together not by welding but by mechanical joining, it is not necessary that the permanent magnets 11 be arranged in a manner to avoid portions to be welded so that heat generated when the short sleeves 30 are welded together will not reach the permanent magnets 11, and also, precise positioning of the short sleeves 30 and the permanent magnets 11 for such arrangement is not necessary. This makes it possible to readily realize a large-sized rotor 5 for use in the electrical rotating machine 100 with increased power density.

In the rotor 5 of the present embodiment, end portions of the adjacent short sleeves 30, the end portions being butted together in the axial direction X, are mechanically joined together by face gear coupling. It should be noted that there are multiple types of face gear coupling, such as curvic coupling and Hirth coupling. Any type of face gear coupling may be used, so long as it allows the face gears 33 formed on the butted surfaces to mesh with each other.

By using face gear coupling for mechanically joining the short sleeves 30 together as described above, circumferential coupling, circumferential positioning, and self-aligning of the short sleeves 30 are realized by merely meshing the face gears 33 of the short sleeves 30 with each other. This makes it possible to simplify the work of forming the sleeve 3 in the production of the rotor 5. Moreover, since the plurality of short sleeves 30 coupled together by the face gear coupling are equal to an integrally formed hollow-shaft, higher torque transmission is realized than in a case where a different type of joint, such as bolt joint, is adopted, and also, even during high-speed rotation of the rotor 5, the positions of the short sleeves 30 relative to each other can be kept fixed favorably.

As described above, it is desirable to use face gear coupling for mechanically joining the short sleeves 30 together. However, the mechanical joining method to be used is not limited to face gear coupling, but may be any mechanical joining method, so long as the method allows the short sleeves 30 to be butt-joined together in a torque-transmittable manner. Examples of such a mechanical joining method include: gear coupling in which the teeth of an internal gear formed on one short sleeve 30 and the teeth of an external gear formed on the other short sleeve 30 are meshed with each other; and gear coupling in which external gears are formed on the to-be-butted end portions of both the short sleeves 30, and the short sleeves 30 are connected together via a collar provided with internal gears meshed with these external gears.

The rotor 5 of the present embodiment includes the pair of end members 31 and 32 fixed to the rotor shaft 9. The sleeve 3 is sandwiched between the pair of end members 31 and 32 from both sides in the axial direction X, such that the adjacent short sleeves 30 are in pressure contact with each other.

As described above, the sleeve 3 is sandwiched between the pair of end members 31 and 32 from both sides in the axial direction X, such that the adjacent short sleeves 30 are in pressure contact with each other in the axial direction X, and thereby the plurality of short sleeves 30 are integrated together. According to this structure, in the production of the rotor 5, the work of bringing the adjacent short sleeves 30 into pressure contact with each other need not be performed for each pair of adjacent short sleeves 30. This makes it possible to simplify the work of manufacturing the rotor 5.

In the rotor 5 of the present embodiment, the short sleeve 30 fitted to the rotor shaft 9 first and the end member 31 fixed to the rotor shaft 9 are mechanically joined together in a torque-transmittable manner. However, the combination of the short sleeve 30 and the end member 31 is not limited to the above example. It will suffice if one of the plurality of short sleeves 30 and one of the pair of end members 31 and 32 fixed to the rotor shaft 9 are mechanically jointed together in a torque-transmittable manner. In the present embodiment, face gear coupling is adopted for mechanically joining the end member 31 and the short sleeve 30 together. However, the mechanical joining method to be adopted is not limited to face gear coupling.

Generally speaking, in the electrical rotating machine 100 of the surface permanent magnet type, when the rotor 5 rotates at high speed, the centrifugal force exerted on the permanent magnets 11 causes the permanent magnets 11 to be separated (lifted) from the surface of the rotor shaft 9 and move away from the surface of the rotor shaft 9 in the outward radial direction. In this respect, in the rotor 5 of the present embodiment, such movement of the permanent magnets 11 in the outward radial direction is blocked by the sleeve 3, which is positioned outward of the permanent magnets 11 in the radial direction, and thereby the permanent magnets 11 are retained around the outer peripheral surface of the rotor shaft 9. At the time, the permanent magnets 11 separated from the surface of the rotor shaft 9 are pressed against the sleeve 3, and due to friction between the inner peripheral surface of the sleeve 3 and the permanent magnets 11, the permanent magnets 11 and the sleeve 3 rotate together. Here, since the sleeve 3 and the rotor shaft 9 are joined together in a torque-transmittable manner, the torque (magnet torque) of the permanent magnets 11 generated by the poles of the magnetic fields and the rotating magnetic field of the permanent magnets 11 of the rotor 5 is transmitted to the rotor shaft 9 via the sleeve 3. Thus, even when the permanent magnets 11 are separated from the rotor shaft 9, the torque of the permanent magnets 11 can be assuredly transmitted to the rotor shaft 9. This makes it possible to allow the electrical rotating machine 100 to deliver predetermined performance even when the rotor 5 rotates at high speed.

In the rotor 5 of the present embodiment, the plurality of permanent magnets 11 form annular rows, each annular row being formed by part of the plurality of permanent magnets 11, the part of the plurality of permanent magnets 11 being arranged on the same circumference on the outer peripheral surface of the rotor shaft 9, and in the annular row, the stoppers 4 are each provided between the permanent magnets 11 that are adjacent to each other in the circumferential direction of the annular row. The stoppers 4 are arranged on the same circumference with the permanent magnets 11 forming the annular row, and are fixed to the rotor shaft 9 in a torque-transmittable manner.

As described above, when the rotor 5 rotates, the centrifugal force causes the permanent magnets 11 to be separated from the surface of the rotor shaft 9, and torque-derived shear force is generated between the rotor shaft 9 and the permanent magnets 11. As a result, the permanent magnets 11 are caused to move in the circumferential direction over the outer peripheral surface of the rotor shaft 9. In this respect, in the rotor 5 according to the present embodiment, such movement of the permanent magnets 11 in the circumferential direction relative to the rotor shaft 9 is blocked by the stoppers 4 (the head portions 41a of the keys 41), and thereby the positions of the permanent magnets 11 relative to the rotor shaft 9 in the circumferential direction are kept. In this manner, favorable rotational balance of the rotor 5 is kept, and stable electrical control of the electrical rotating machine 100 is kept.

The permanent magnets 11 separated from the surface of the rotor shaft 9 as described above are pressed against the stoppers 4, and the torque of the permanent magnets 11 is transmitted to the rotor shaft 9 via the stoppers 4. Thus, even when the permanent magnets 11 are separated from the rotor shaft 9, the torque of the permanent magnets 11 can be assuredly transmitted to the rotor shaft 9. This makes it possible to allow the electrical rotating machine 100 to deliver predetermined performance even when the rotor 5 rotates at high speed.

In the rotor 5 of the present embodiment, each stopper 4 is realized as the key 41, which includes: the base portion 41b fitted in the key groove 92 formed in the rotor shaft 9; and the head portion 41a protruding from the outer peripheral surface of the rotor shaft 9 in the radial direction.

As thus described, each stopper 4 joined to the rotor shaft 9 in a torque-transmittable manner can be realized with a simple structure that is easy to manufacture. However, the stopper 4 according to the present invention is not limited to the key 41, but may be realized as any member, so long as the member is fixed to the rotor shaft 9 in a torque-transmittable manner and is capable of blocking the movement of the permanent magnets 11 in the circumferential direction.

In the rotor 5 of the present embodiment, each of the short sleeves 30 and the stoppers 4 is made of a non-magnetic material. This makes it possible to suppress the influence of the sleeve 3 and the stoppers 4 on the electromagnetic design of the rotor 5. In particular, by choosing a low electrical-resistance material as the material of the short sleeves 30, the generation of heat due to the eddy currents can be suppressed more effectively.

The description of the preferred embodiment of the present invention has been given as above. From the foregoing description, numerous modifications and other embodiments of the present invention are obvious to a person skilled in the art. Therefore, the foregoing description should be interpreted only as an example and is provided for the purpose of teaching the best mode for carrying out the present invention to a person skilled in the art. The structural and/or functional details may be substantially altered without departing from the spirit of the present invention.

REFERENCE SIGNS LIST 1 stator
3 sleeve
4 stopper
  41 key
    41a head portion
    41b base portion
5 rotor
9 rotor shaft
11 permanent magnet
30 short sleeve
31 end member
32 end member
33 face gear
92 key groove
100 electrical rotating machine

The invention claimed is:

1. A rotor of an electrical rotating machine, the rotor comprising:
a rotor shaft;

a cylindrical sleeve externally fitted to the rotor shaft and extending in an axial direction; and a plurality of permanent magnets serving as field magnets, the plurality of permanent magnets being provided between the rotor shaft and the cylindrical sleeve in a radial direction and retained by the cylindrical sleeve around the rotor shaft, wherein the cylindrical sleeve is formed by a plurality of short cylindrical sleeves arranged in the axial direction, and end portions of the short cylindrical sleeves that are adjacent to each other, the end portions being butted together in the axial direction, are mechanically joined together in a torque-transmittable manner.

2. The rotor of an electrical rotating machine according to claim 1, wherein each of the end portions of the adjacent short cylindrical sleeves has a face gear, the end portions being butted together in the axial direction and being joined together by face gear coupling.

3. The rotor of an electrical rotating machine according to claim 1, further comprising a pair of end members that is fixed to the rotor shaft and between which the cylindrical sleeve is sandwiched from both sides in the axial direction, such that the adjacent short cylindrical sleeves are in pressure contact with each other.

4. The rotor of an electrical rotating machine according to claim 3, wherein one of the plurality of short cylindrical sleeves and one of the pair of end members fixed to the rotor shaft are mechanically joined together in a torque-transmittable manner.

5. The rotor of an electrical rotating machine according to claim 1, wherein each of the plurality of short cylindrical sleeves is made of a non-magnetic material.

6. The rotor of an electrical rotating machine according to claim 1, wherein the plurality of permanent magnets form annular rows, each annular row being formed by part of the plurality of permanent magnets, the part of the plurality of permanent magnets being arranged on a same circumference on an outer peripheral surface of the rotor shaft, and the rotor further comprises a stopper that is, in each annular row, disposed between the permanent magnets that are adjacent to each other in a circumferential direction of the annular row, the stopper being disposed on the same circumference with the adjacent permanent magnets and fixed to the rotor shaft in a torque-transmittable manner.

7. The rotor of an electrical rotating machine according to claim 6, wherein the stopper is made of a non-magnetic material.

8. The rotor of an electrical rotating machine according to claim 6, wherein the stopper is a key that includes:
a base portion fitted in a key groove formed in the rotor shaft; and
a head portion protruding from the outer peripheral surface of the rotor shaft in a radial direction.

* * * * *